Dec. 26, 1967     D. B. FOURNIER     3,359,785
HYDRAULIC APPARATUS FOR TESTING LEAKS
Filed May 28, 1965     3 Sheets-Sheet 1

INVENTOR:
DANIEL B. FOURNIER
BY
ATTORNEYS

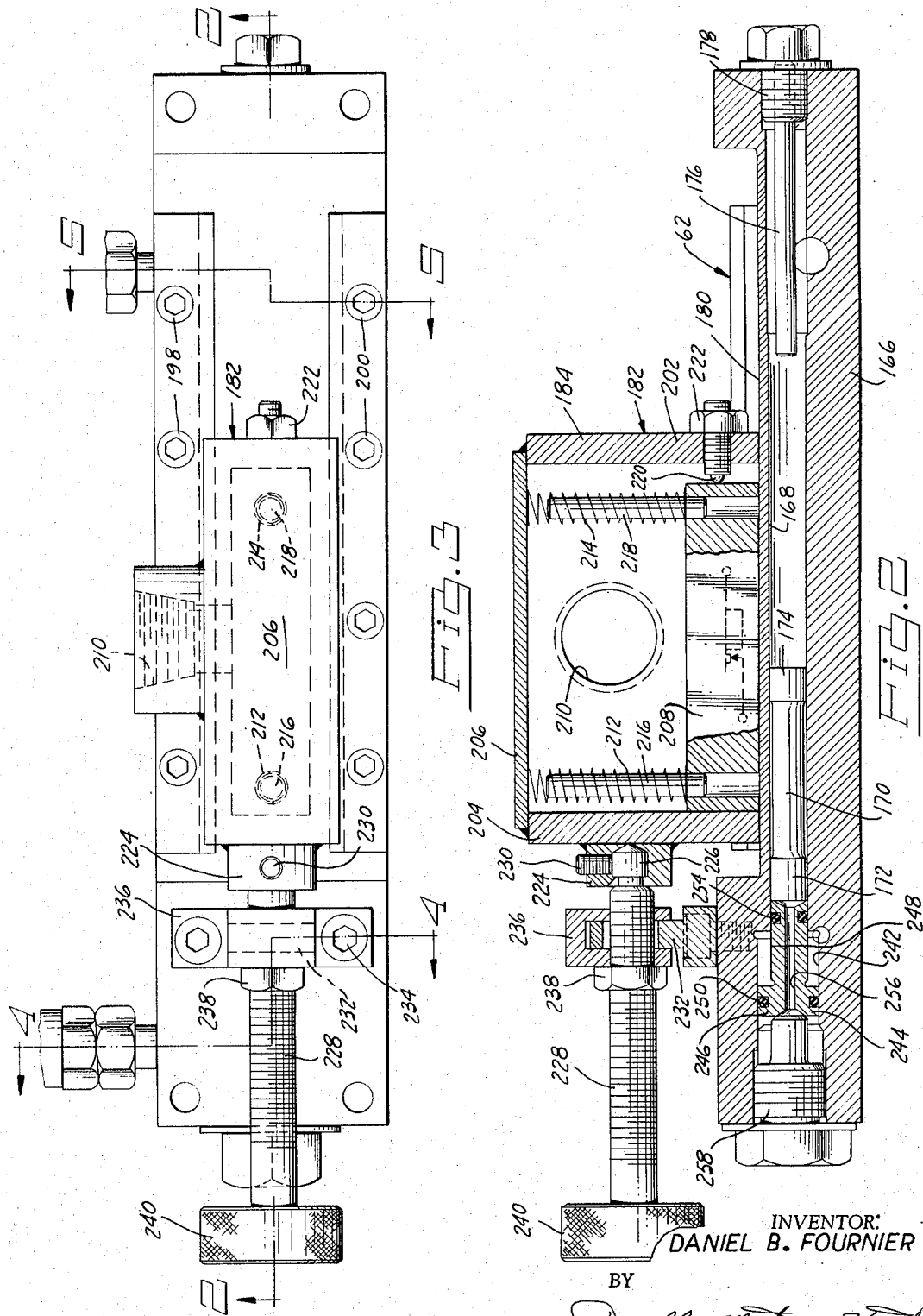

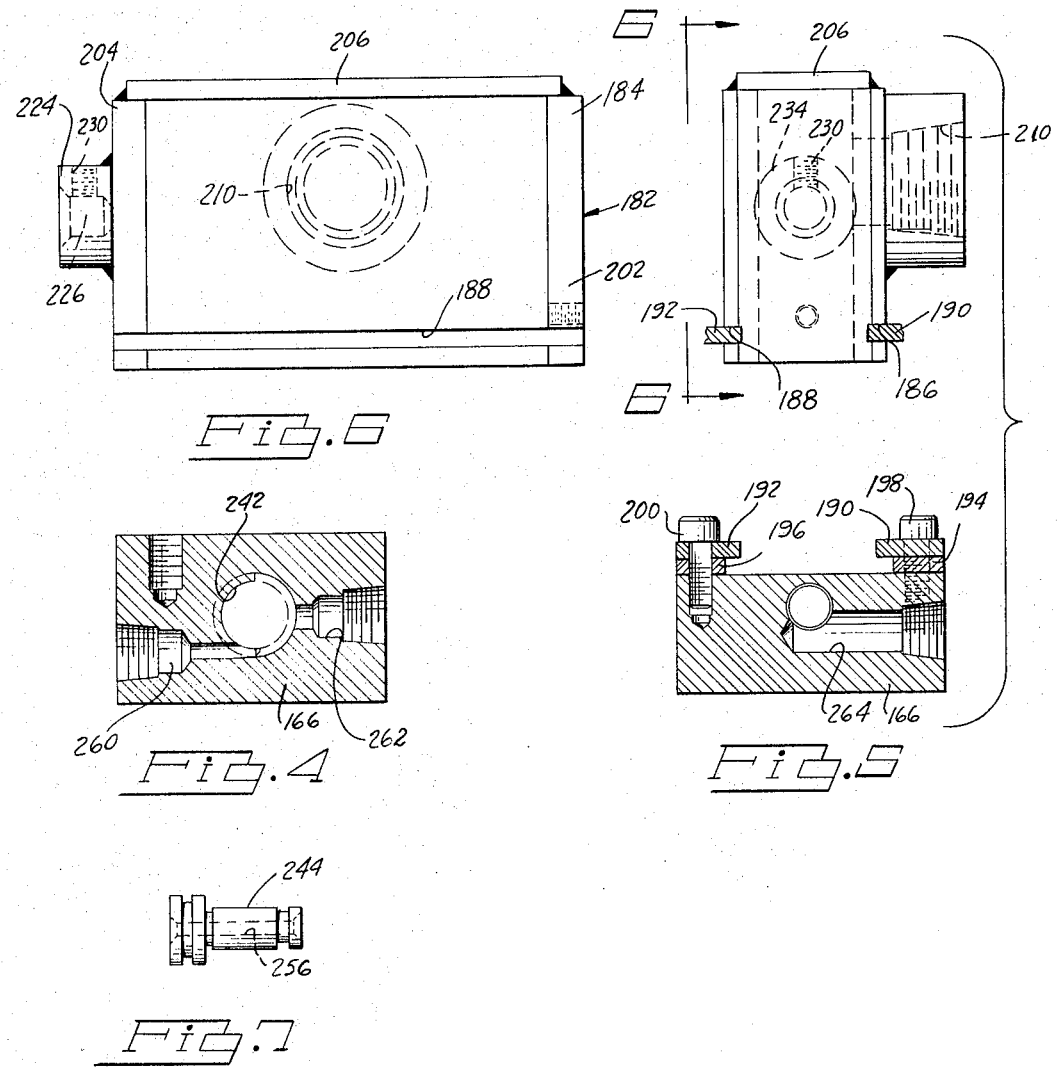

United States Patent Office 3,359,785
Patented Dec. 26, 1967

3,359,785
HYDRAULIC APPARATUS FOR TESTING LEAKS
Daniel B. Fournier, Roseville, Mich., assignor to Jered Industries, Inc., Birmingham, Mich., a corporation of Michigan
Filed May 28, 1965, Ser. No. 459,785
7 Claims. (Cl. 73—40)

ABSTRACT OF THE DISCLOSURE

This specification describes a hydrostatic leak test instrument for determining the presence of leaks in hollow test parts. It includes a movable member slidably situated in a pressure cavity, one end of which is in fluid communication with the test part and the other end of which is subjected to a controlled test pressure during a test interval. A valve circuit during the test interval isolates the portion of the chamber in communication with the test part from the other parts of the circuit. Leakage of pressurized fluid from the test part will result in displacement of the movable member. Defects in the part are detected when the movable member is displaced during a given test interval beyond a predetermined displacement setting.

---

My invention relates generally to hydraulic testing equipment for testing test parts for leaks and excessive porosity. My invention relates more particularly to a leak test indicator for testing the degree of leakage in a given test part when it is subjected to a test pressure of known value for a predetermined time.

It is an object of my invention to provide improvements in leak test equipment of the type above set forth by employing test elements in a static pressure circuit that respond to changes in pressure in the test part due to leakage to indicate whether the leakage rate falls within preselected limits.

It is a further object of my invention to provide a hydrostatic leak test circuit of the type set forth in the foregoing paragraphs wherein one of the circuit elements is capable of being displaced through a distance that is proportional to the rate of fluid leakage through a test part.

It is a further object of my invention to provide improvements in a hydrostatic leak test circuit of the type above set forth wherein the displacement of a movable element of the circuit can be used to establish an empirical test rating that can be compared with preselected limit values, whereby appropriate tolerances can be established for the test parts under consideration.

It is a further object of my invention to provide a hydrostatic leak test circuit of the type above set forth wherein provision may be made for adapting it for use with any of a variety of test part forms and sizes while utilizing the same circuit components.

Further objects and features of my invention will become apparent from the following description and from the accompanying drawings, wherein:

FIG. 2 is a cross sectional view of the leak test indicator portion of the circuit of FIG. 1;

FIG. 3 is a plan view of the structure of FIG. 2;

FIG 4 is a cross sectional view taken along the plane of section line 4—4 of FIG. 3;

FIG. 5 is a cross sectional view taken along the plane of section line 5—5 of FIG. 3;

FIG. 6 is a side elevation view of the upper part of the structure of FIG. 5 as viewed from the plane of section line 6—6 of FIG. 5; and, FIG. 7 is a detail view of a reset plunger indicated in cross sectional form in FIG. 2.

Figure 1:
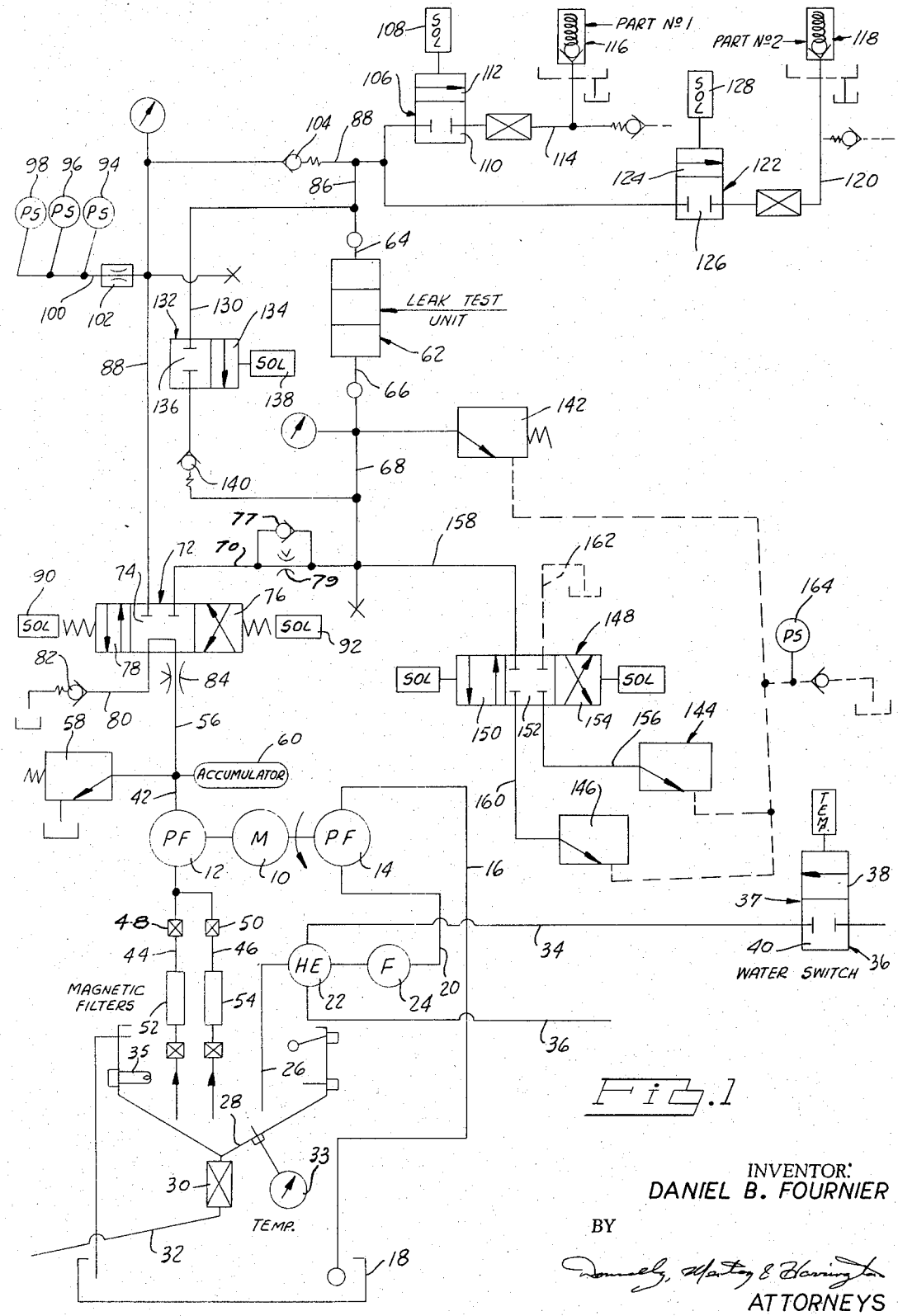
FIG. 1 shows in schematic form a hydrostatic circuit for a leak test indicator embodying the improvements of my invention.

Referring first to FIG. 1, numeral 10 indicates an electric motor which is coupled to a fluid pump 12. The pump 12 acts as a pressure source for the circuit. Also powered by motor 10 is a heat exchanger pump 14 which is fed with fluid through a feed passage 16. This passage extends to a fluid reservoir 18.

The discharge side of the pump 14 is connected by means of a passage 20 to a heat exchanger 22. A fluid filter 24 is located in the passage 20. The discharge side 26 of the heat exchanger 22 extends to a collector 28. It may pass from the collector through a valve 30 into the sump 18. A valve controlled drain-off passage 32 can be used if desired to bypass the sump 18.

A temperature indicator 33 provides a visual indication of the temperature of the fluid. By appropriately controlling the rate of flow through the heat exchanger 22, the temperature of the fluid can be controlled. Cooling fluid is applied to the heat exchanger 22 through a water feed passage 34. A water return passage 36 returns the heat exchanger coolant to a sink. Flow of water through the feed passage 34 is controlled by a water switch numeral 37 having an open position, as shown at 38, and a closed position, as shown at 40.

A heater 35 also is in the collector 28. This heater, together with the heat exchanger 22, maintains a constant temperature of the fluid in the circuit. The water switch 36 and the heater 35 respond to temperature changes by means of a conventional thermostatic circuit.

The pump 12 has a feed passage 42. This communicates with parallel delivery passages 44 and 46, in which are located flow-control valves 48 and 50, respectively. Magnetic filters 52 and 54 can be located in the passages 44 and 46.

Pump 12 communicates with a high pressure delivery passage 56. A pressure relief valve 58, which may be calibrated for a value of approximately 1500 p.s.i., is connected to passage 56. Connected also to passage 56 is a pressure accumulator chamber 60 which is used to avoid sharp pressure disturbances in the discharge side of the pump 12.

The leak test unit is indicated generally in FIG. 1 by reference character 62. This unit will be described in detail with reference to FIGS. 2 through 7. For purposes of this description, the downstream side of the unit 62 will be designated by reference character 64 and the upstream side will be designated by reference character 66. Side 66 communicates with passage 68 which in turn communicates with passage 70.

A solenoid operated three-way valve 72 controls communication between passage 70 and passage 56. Valve 72 includes three positions; namely, a neutral position 74, a cross-flow position 76 and a parallel flow position 78. When the valve 72 assumes the position shown in FIG. 1, communication is established between passage 56 and a low pressure exhaust passage 80. A spring loaded check valve 82 may be inserted in passage 80 in order to maintain a slight reference pressure in the circuit to avoid cavitation. This pressure may be 5 p.s.i. An adjustable orifice 84 also can be inserted in the passage 56 to provide additional flow control.

When the valve 72 assumes the neutral position shown at 74 in FIG. 1, communication between passage 56 and passage 70 is interrupted. Communication is established, however, between passage 56 and passage 80.

The downstream side 64 of the leak test unit 62 is connected to passage 86 which extends to passage 88, the latter in turn communicating with valve 72. Communication between passage 88 and either of the passages 56 or 80 is interrupted, however, when the valve 72 assumes the neutral position shown in FIG. 1.

Valve 72 can be adjusted from one position to the other by means of solenoid operators 90 and 92. These operators in turn can be controlled by a solenoid circuit which includes pressure switches 94, 96 or 98. These are situated in a passage 100 which is in fluid communication with passage 88. If desired, a snubber in the form of an orifice 102 can be located in the passage 100.

A one-way check valve 104 located in passage 88 permits distribution of pressure from valve 72 to a pressure distribtuion valve 106. Pressure distribtuion in the opposite direction, however, is prevented by valve 104. Valve 106 can be controlled by a solenoid operator 108. This in turn can be controlled by means of a pressure switch like the one, for example, shown at 94.

Switch 98 in one operating embodiment of my invention is calibrated to close the electric solenoid circuit when it is subjected to a pressure of 1150 p.s.i. The corresponding calibrated pressure points for the pressure switches 96 and 94 are 1100 p.s.i. and 900 p.s.i.

Switch 106 can assume either a closed position as shown at 110, or a pressure distributing position as shown at 112. It controls communication between passage 88 and a passage 114 which in turn can be connected to a test part shown at 116. This test part can be of any form. It can be mounted in the circuit by means of suitable fluid pressure fittings with the interior of the part in fluid communication with passage 114.

If desired, a second test part 118 can be arranged in parallel disposition with respect to test part 116. It may be assembled in fluid communication with passage 120 which communicates with passage 88 through a solenoid controlled test valve 122. This valve has an open position 124 and a closed position 126. It is controlled by a solenoid operator 128 in the same fashion as operator 108. If this sub-circuit is employed, a second test part can be tested during the same test procedure.

A cross-over passage 130 interconnects the downstream side 64 of the unit 62 with the upstream side 66. Pressure distribtuion through the passage 130 is controlled by a solenoid operated valve 132 having two positions 134 and 136. The position of the valve numeral 132 is controlled by the solenoid operator 138.

A one-way check valve 140 in passage 130 provides pressure distribtuion from passage 86 to passage 68. Pressure distribution in the opposite direction, however, is inhibited.

A pressure regulator valve 142 communicates with passage 68 and is adapted to maintain a pressure of a predetermined value, such as 1000 p.s.i. If it is desired to conduct the test at different pressure levels, the pressure in passage 68 can be controlled instead by regulator valves 144 or 146. Valve 144 may be calibrated for a value such as 950 p.s.i. and valve 146 may be calibrated for a value such as 750 p.s.i. The regulator valves 142, 144, and 146 can be selected by a solenoid operated selector valve 148 having three positions indicated by reference characters 150, 152 and 154. When the valve assumes the position shown, regulator valve 142 functions to maintain a regulated pressure level in passage 68. On the other hand, if the valve is shifted to the position shown at 154, regultaor valve 144 becomes operative as passage 68 becomes connected to communicating passage 156 through the valve 148 and passage 158. If the valve is shifted to the position shown at 150, however, passage 158 becomes connected to a passage 160 which leads to the regulator valve 146 and the passage 156 becomes connected to an exhaust passage 162.

Pressure switch 164 is located on the common low pressure side of regulator valves 142, 144 and 146. It senses the presence or absence of pressure on the discharge sides of these valves. If pressure greater than a predetermined value is present, it is not possible to unlatch the test part. The test part can be removed from the circuit only after the pressure switch 164 opens a circuit that controls the locking latches for the test parts.

The leak test unit 62 is shown in more particular detail in FIGS. 2 through 7.

In FIGS. 2 and 3, the test unit 62 is shown with a base 166. This base is formed with a cylindrical opening 168 within which is slidably positioned a cylindrical plunger 170. Close tolerances are maintained on the dimensions of the plunger 170 and the cooperating opening 168.

Plunger 170 comprises a pair of spaced lands 172 and 174.

Positioned within the right hand end of opening 168 is a stop in the form of a stem 176. This stem is carried by a threaded plug 178 which is received threadably within a threaded end of the opening 168.

The upper surface 180 of the body 166 is machined with a smooth finish. Seated upon surface 180 is proximity switch assembly 182. This includes a cage 184 having longitudinal grooves 186 and 188 at the lower end thereof.

Groove 186 receives a guide rail 190 and groove 188 receives a corresponding guide rail 192. Spacers 194 and 196 are situated between the body 166 and each of the rails 190 and 192, respectively. Clamping bolts 198 and 200 are provided for maintaining the rails 190 and 192 in assembled relationship.

Cage 184 includes a pair of sidewalls 202 and 204 as well as an upper closure plate 206. The cage is adapted to slide upon the surface 180, and it is guided in this movement by the rails 190 and 192.

Situated in the cage 184, within body 208, are switching elements (not shown). These may comprise magnets carried by reeds. The magnets are situated in close proximity to each other. The reeds form one of several conductors in the switching circuit. The electrical leads for the switching elements are received within the cage 184, and they extend through an adapter that can be threadably received within one side of the cage, said adapter being indicated generally by reference character 210.

Body 208 is urged normally into sealing engagement with the surface 180 by springs 212 and 214 which are situated between the body 208 and the closure plate 206. These springs surround spring locating pins 216 and 218, which are received within cooperating cylindrical openings in the body 208.

A locator in the form of a spring plunger 220 engages one side of the body 208. It is threadably received within a threaded opening formed at the wall 202. A lock nut 222 can be used to hold the plunger 220 in a fixed position.

Wall 204 carries an adapter 224 which receives one end 226 of a threaded adjusting member 228. The end 226 is held in place by a set screw 230 located in the adapter 224.

A retainer 232 is bolted by means of bolts 234 to the upper side of the body 166. Received over retainer 232 is a threaded adapter 236 through which a threaded stem of the adjusting element 228 is received. This stem can rotate with respect to the end 226 although axial displacement of the end 226 with respect to the stem is prevented.

A lock nut 238 can be used to fix the position of the stem for member 228 with respect to the adapter 236. It is apparent from the foregoing description that when the member 228 is adjusted manually, the axial position of the gauge 182 with respect to the opening 168 can be changed. A knob 240 on the member 228 facilitates manual adjustment.

The left hand end of the opening 168 is formed with a large diameter as indicated at 242. Located within this diameter is a plunger 244 having a large diameter part 246 and a small diameter part 248, the latter being received within the small diameter portion of the opening 168.

Parts 246 and 248 are provided with fluid seals 250 and

254. A central opening 256 in the plunger 244 provides continuous communication between the left hand side of the part 244 and the right hand side of the part 248. A stop in the form of a threaded plug 258 is threadably received within the left hand end of the large diameter portion 242 of the opening 168.

An exhaust port is indicated at 260. As the reset plunger 244 moves, the port 260 prevents a fluid lock on the right hand side of the part 244. A pressure port 262 formed in the body 166 communicates with the left hand side of the part 246. Port 262 communicates with the passage extending from side 66 shown in FIG. 1.

A port 264 located in the right hand end of the opening 168 provides communication between the opening 168 and the passage extending from end numeral 64 shown in FIG. 1.

During operation of the unit, the operator may insert either one or more test parts in the system. At this time the valve 72 is in the neutral position 74. The pump 12 maintains a uniform pressure of about 5 p.s.i. because of the operation of the relief valve 82. When the operator triggers the operation of an electrical timer circuit, valve 72 shifts in a left hand direction to position 76. This causes passage 56 to be connected to passage 88 while passage 70 becomes connected to low pressure exhaust passage 80. The downstream side 64 of the test unit 62 thus becomes pressurized thereby causing plunger 170 to be shifted in the left hand direction as viewed in FIG. 2. This quick return is permitted by check valve 77, which by-passes an adjustable restriction 79. When the plunger 170 is in the extreme left hand position indicated in FIG. 2, the contacts of the proximity switches shown generally at 182, which are located within the body 208 as indicated earlier, assume an open circuit position.

After the pressure build-up exceeds a predetermined value at which one of the switches 94, 96 or 98 is calibrated, the valve 72 will be shifted in a right hand direction to the position shown at 78. Any one of the switches 94, 96 or 98 can be chosen as desired by suitably rotating an appropriate selector to introduce the desired pressure switch into the circuit.

When the pressure switch closes and the valve 72 is shifted to the right, passage 88 becomes connected to exhaust passage 80 while passage 56 becomes connected to passage 70. Valve 132 remains in a closed position. It is closed also at a time prior to the triggering of the valve 72. When it is closed, the upstream side 66 of unit 62 is isolated from the downstream side 64 of unit 62. As soon as the valve 72 has shifted to the position 78, reset plunger 244 is shifted until the part 246 engages the right hand end of the large diameter portion 242 of the opening 168. At this time the plunger 170 is positioned precisely within the opening 168 at a position from which the measuring portion of the cycle is begun.

After the plunger 170 becomes located in this fashion at its starting position, the timing circuit allows valve 132 to assume an open position.

Valve 72 is shifted in a right hand direction to the position 78, as above explained, when the limit pressure value of switches 94, 96 or 98 is reached. During the time that valve 72 was in position 76, however, the test part was pressurized with a pressure of relatively high magnitude. Thus purged the air from the test part and established a stabilized pressure. When the valve 72 assumes position 78, passage 88 becomes open to the exhaust passage 80. Check valve 104 prevents a pressure bleed-off from the part numeral 116 through the passage 88. At the same time passage 56 is brought into communication with passage 70 thereby bringing the pressure in passage 68 to the maximum value.

Valve 132 is shifted by solenoid operator 138 to the open position, following movement of valve 72 to position 78, to stabilize the system. The initial charge pressure in the test part may be higher than the pressure maintained by regulator valves 142, 144 or 146. This brings both sides 64 and 66 into fluid communication. At that time, as mentioned above, the reset plunger 244 is shifted in a right hand direction to position the cylinder 170 at the proper position to initiate a test. Shifting movement of the reset plunger 244 in a right hand direction takes place regardless of the fact that the pressure on either side thereof is at the same value. This occurs because the effective area on the left hand side of the plunger is greater than the effective area on its right hand side.

After the reset plunger has been shifted and the system is stabilized, the timer circuit causes the solenoid operator 138 to shift the valve 132 to the closed position. This isolates end 64 from end 66. It is at this instant that the rate measuring cycle begins. If the part 116 contains a leak, a pressure drop will be experienced in passage 86. This will cause the pressure on the left hand side of the plunger 170 to shift the plunger 170 in a right hand direction. The amount of the displacement of the plunger 170 is proportional to the amount of the leakage. After a predetermined time interval, the timer circuit allows the valves to assume their original position. If the plunger 170 will not have moved at that time to a displacement that is sufficient to cause the proximity switch to close, the part has successfully passed the leak test. If during the test interval, however, the proximity switch is closed, this indicates that the test part has an excessive leakage and should be rejected.

An appropriate test specification can be established depending upon the application for the particular part and the nature of the material that is used.

The valve 106 is open at the time the valve 72 is shifted in a left hand direction. It continues to assume an open position throughout the entire test cycle. The valve 122, of course, functions in a fashion similar to the valve 106. It is not required, however, unless an additional test part 118 is being tested.

If the operator chooses to employ pressure switch 98, the valve 148 assumes the position shown. Thus the pressure on the side 66 of the test unit is controlled by the regulator valve 142. If, however, the operator chooses to use pressure switch 96 and to conduct the test at a lower pressure level, the operator, by means of a manually controlled switching circuit, causes valve 148 to assume the right hand position 154. Passage 158 then becomes connected to passage 156 and valve 144 controls the pressure on the end 66 of the test unit. Valves 142 and 146 are inoperative under these conditions.

Valve 146 becomes operative when the valve 148 is shifted in the right hand direction to the position 150. At this time, pressure switch 94 becomes functional. Thus the operator can choose any one of three pressure levels for conducting the test.

Having thus described a preferred embodiment of my invention what I claim and desire to secure by U.S. Letters Patent is:

1. A leak test system comprising a unit having a fluid cavity, a movable plunger in said cavity, a fluid pressure source, conduit structure interconnecting said pressure source and a test part, a first passage forming a part of said conduit structure for distributing pressure from said source to one side of said plunger, another passage connecting the other side of said plunger to said test part, and valve means for selectively interrupting communication between said other side of said plunger and said source and establishing a hydraulic lock between said plunger and said test part whereby leakage of fluid from said test part will effect displacement of said plunger, and means for detecting a predetermined displacement of said plunger during a test interval, said displacement being a measure of the rate of leakage from said test part, a reset plunger adjacent said movable plunger and engageable therewith, a pressure area on said reset plunger, a stop disposed in the line of motion of said reset plunger, and branch passage means for distributing pressure from said source to said pressure area to move said reset plunger against said stop thereby precisely setting said movable plunger at a starting point.

2. A fluid leak tester comprising a fluid cavity, a movable piston in said cavity, a fluid pressure source, conduit structure interconnecting said pressure source and a test part, a first passage forming a part of said conduit structure for distributing pressure from said source to one side of said piston, another passage connecting the other side of said piston to said test part, valve means for selectively interrupting communication between said other side of said chamber and said source whereby leakage of fluid from said test part will effect displacement of said piston, a reset plunger located in one end of said cavity on one side of said piston, said reset plunger being formed with a central opening to permit fluid communication therethrough, the effective fluid pressure working area on one side of said reset plunger being greater than the corresponding fluid pressure working area on the other side thereof, and the means for limiting the displacement of said reset plunger under the influence of the pressure differential thereacross whereby said piston is positioned within said cavity at a precise starting point.

3. A fluid leak test system comprising a fluid cavity, a movable piston in said cavity, a fluid pressure source, conduit structure interconnecting said pressure source and a test part, passages forming a part of said conduit structure for distributing pressure from said source to one side of said piston, another passage means connecting the other side of said piston to said test part, valve means for selectively interrupting communication between said other side of said chamber whereby leakage of fluid from said test part will effect displacement of said piston, means for detecting a predetermined displacement of said piston during a test interval, a reset plunger located in one end of said cavity on one side of said piston, said reset plunger being formed with a central opening to permit fluid communication therethrough, the effective fluid pressure working area on one side of said reset plunger being greater than the corresponding fluid pressure working area on the other side thereof, and means for limiting the displacement of said reset plunger under the influence of the presure differential thereacross whereby said piston is positioned within said cavity at a precise starting point.

4. A fluid leak test units comprising a cavity, a movable plunger in said cavity, a fluid pressure source, conduit structure interconnecting said pressure source and a test part, a first passage forming a part of said conduit structure for distributing pressure from said source to one side of said plunger, another passage connecting the other side of said plunger to said test part, valve means for selectively interrupting communication between said other side of said plunger whereby leakage of fluid from said test part will effect displacement of said plunger, detecting means mounted externally of said cavity in close proximity to said piston for detecting a predetermined displacement of said plunger, means for adjustably positioning said detecting means with respect to said plunger to establish leakage tolerances, a reset plunger adjacent said movable plunger and engageable therewith, a pressure area on said reset plunger, a stop disposed in the line of motion of said reset plunger, and branch passage means for distributing pressure from said source to said pressure area to move said reset plunger against said stop thereby precisely setting said movable plunger at a starting point.

5. A fluid leak test system comprising a cavity, a movable plunger in said cavity, a fluid pressure source, conduit structure interconnecting said pressure source and a test part, a first passage forming a part of said conduit structure for distributing pressure from said source to one side of said plunger, another passage connecting the other side of said plunger to said test part, valve means for selectively interrupting communication between said other side of said plunger and said source and establishing a fluid lock between said plunger and said test part whereby leakage of fluid from said test part will effect displacement of said plunger, and means for detecting a predetermined displacement of said plunger during said test interval, said detecting means being mounted externally of said cavity in close proximity to said plunger, means for adjustably positioning said position detecting means with respect to said plunger to establish leakage tolerances, a reset plunger adjacent said movable plunger and engageable therewith, a pressure area on said reset plunger, a stop disposed in the line of motion of said reset plunger, and branch passage means for distributing pressure from said source to said pressure area to move said reset plunger against said stop thereby precisely setting said movable plunger at a starting point.

6. A fluid leak tester comprising a fluid cavity, a movable piston in said cavity, a fluid pressure source, conduit structure interconnecting said pressure source and a test part a first passage forming a part of said conduit structure for distributing pressure from said source to one side of said piston, another passage connecting the other side of said piston to said test part, valve means for selectively interrupting communication between said other side of said chamber whereby leakage of fluid from said test part will effect displacement of said piston, a reset plunger located in one end of said cavity on one side of said piston, said reset plunger being formed with a central opening to permit fluid communication therethrough, the effective fluid pressure working area on one side of said reset plunger being greater than the corresponding fluid pressure working area on the other side thereof, means for limiting the displacement of said reset plunger under the influence of the pressure differential thereacross whereby said piston is positioned within said cavity at a precise starting point, detecting means being mounted externally of said cavity in close proximity to said piston for detecting a predetermined displacement of said piston, and means for adjustably positioning said detecting means with respect to said piston to establish leakage tolerances.

7. A fluid leak test system comprising a fluid cavity, a movable piston in said cavity, a fluid pressure source, conduit structure interconnecting said pressure source and a test part, passages forming a part of said conduit structure for distributing pressure from said source to one side of said piston, another passage means connecting the other side of said piston to said test part, valve means for selectively interrupting communication between said other side of said chamber whereby leakage of fluid from said test part will effect displacement of said piston, a reset plunger located in one end of said cavity on one side of said piston, said reset plunger being formed with a central opening to permit fluid communication therethrough, the effective fluid pressure working area on one side of said reset plunger being greater than the corresponding fluid pressure working area on the other side thereof, means for limiting the displacement of said reset plunger under the influence of the pressure differential thereacross whereby said piston is positioned within said cavity at a precise starting point, detecting means being mounted externally of said cavity in close proximity to said piston for detecting a predetermined displacement of said piston, and means for adjustably positioning said detecting means with respect to said piston to establish leakage tolerances.

References Cited
UNITED STATES PATENTS

| | | | |
|---|---|---|---|
| 3,019,734 | 2/1962 | Bourquin | 73—40 X |
| 3,090,221 | 5/1963 | Cosby | 73—40 |
| 3,092,821 | 6/1963 | Muehlner | 73—40 X |
| 3,151,478 | 10/1964 | Heldenbrand | 73—49.1 X |
| 3,176,503 | 4/1965 | Robinson | 73—40 |
| 3,248,931 | 5/1966 | Berger et al. | 73—49.2 |

LOUIS R. PRINCE, *Primary Examiner.*

JEFFREY NOLTON, *Assistant Examiner.*